United States Patent
Weber et al.

(10) Patent No.: US 7,105,591 B2
(45) Date of Patent: Sep. 12, 2006

(54) BLENDS OF POLYARYLETHER SULPHONE AND POLYAMIDE, WITH IMPROVED VISCOSITY AND FLOWABILITY

(75) Inventors: Martin Weber, Maikammer (DE); Joachim Queisser, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/257,875

(22) PCT Filed: Apr. 26, 2001

(86) PCT No.: PCT/EP01/04730

§ 371 (c)(1),
(2), (4) Date: Oct. 17, 2002

(87) PCT Pub. No.: WO01/83618

PCT Pub. Date: Nov. 8, 2001

(65) Prior Publication Data

US 2003/0139494 A1    Jul. 24, 2003

(30) Foreign Application Priority Data

Apr. 28, 2000    (DE) ................................ 100 20 785

(51) Int. Cl.
*C08L 81/06*    (2006.01)
*C08K 3/10*    (2006.01)

(52) U.S. Cl. ...................... 524/413; 523/435; 523/458; 525/423; 525/535

(58) Field of Classification Search ................ 523/435, 523/458; 524/413; 525/423, 535
See application file for complete search history.

(56) References Cited

U.S. PATENT DOCUMENTS 4,902,727 A * 2/1990 Aoki et al. .................... 522/90
4,921,889 A    5/1990 Lausberg et al.
5,639,833 A    6/1997 Weber et al.
6,509,403 B1 * 1/2003 Weber ........................ 524/413

FOREIGN PATENT DOCUMENTS

| DE | 2 122735 | 5/1971 |
|---|---|---|
| DE | 198 39331 | 3/2000 |
| EP | 270 998 | 6/1988 |
| EP | 477 757 | 4/1992 |
| JP | 03273056 | * 12/1991 |
| WO | 00/012601 | 3/2000 |

OTHER PUBLICATIONS

Chem. Abst. 116:130582.

* cited by examiner

*Primary Examiner*—Jeffrey B. Robertson
(74) *Attorney, Agent, or Firm*—Novak Druce & Quigg, LLP; Jason D. Voight

(57) ABSTRACT

The thermoplastic molding composition comprises components A, C, D, E and, where appropriate, B, F and G, the total weight of which is 100% by weight, and also component H:
a) as component A, from 5 to 94.8% by weight of at least one polyaryl ether sulfone,
b) as component B, from 0 to 20% by weight of at least one functionalized polyaryl ether sulfone,
c) as component C, from 5 to 94.8% by weight of at least one polyamide,
d) as component D, from 0.1 to 10% by weight of at least one epoxy resin,
e) as component E, from 0.1 to 60% by weight of fibrous or particulate fillers or a mixture of these,
f) as component F, from 0 to 40% by weight of impact-modifying rubbers which have functional groups,
g) as component G, from 0 to 40% by weight of other conventional additives and processing aids,
h) as component H, from 100 ppm to 0.5% by weight, based on the amounts of components A to G, of copper bromide and/or copper iodide.

10 Claims, No Drawings

BLENDS OF POLYARYLETHER SULPHONE AND POLYAMIDE, WITH IMPROVED VISCOSITY AND FLOWABILITY

The present invention relates to polyaryl ether sulfone/polyamide blends with improved toughness and flowability, to a process for their production, and to their use. Blends made from polyaryl ether sulfones with polyamides are known per se. By way of example, DE-A-21 22 735 describes thermoplastic polymer mixtures made from aromatic polysulfones with polyamides. Products of this type have advantageous properties, such as high stiffness and good chemical resistance. A disadvantage is the low toughness of these materials, attributable to the chemical incompatibility of the components. In addition, flowability is not adequate for every application, especially in the case of injection molding.

EP-A-0 477 757 also describes polyamide/polyaryl ether sulfone blends which have partly aromatic polyamides. The molding compositions described have improved stiffness and strength at up to 110° C.

The molding compositions known hitherto do not have adequate heat resistance for every application. If the products are used for prolonged periods above 150° C., their level of mechanical properties deteriorates markedly.

Molding compositions with improved heat resistance are described in the earlier-priority unpublished document DE-A-198 39 331. However, the toughness and flowability of these products is still inadequate for some applications.

It is an object of the present invention to provide polyaryl ether sulfone/polyamide blends which have improved toughness and flowability in addition to good heat resistance.

We have found that this object is achieved by means of a thermoplastic molding composition comprising components A, C, D, E and, where appropriate, B, F and G, the total weight of which is 100% by weight, and also component H:

a) as component A, from 5 to 94.8% by weight of at least one polyaryl ether sulfone,
b) as component B, from 0 to 20% by weight of at least one functionalized polyaryl ether sulfone,
c) as component C, from 5 to 94.8% by weight of at least one polyamide,
d) as component D, from 0.1 to 10% by weight of at least one epoxy resin,
e) as component E, from 0.1 to 60% by weight of fibrous or particulate fillers or a mixture of these,
f) as component F, from 0 to 40% by weight of impact-modifying rubbers which have functional groups,
g) as component G, from 0 to 40% by weight of other conventional additives and processing aids,
h) as component H, from 100 ppm to 0.5% by weight, based on the amounts of components A to G, of copper bromide and/or copper iodide.

According to the invention, it has been found that the use in particular of the epoxy resin described in component D markedly improves the impact strength and flowability of the polymer blends, while the other advantageous mechanical properties are retained.

The individual components of the thermoplastic molding compositions of the invention are described in more detail below.

Component A

The proportion of component A in the molding compositions of the invention may vary over a wide range, from 5 to 94.8% by weight. Preferred molding compositions of the invention comprise from 15 to 85% by weight, in particular from 30 to 60% by weight, of component A, based on the total weight of components A to G. Particularly preferred molding compositions comprise from 40 to 50% by weight of component A, based on the total weight of A to G.

According to the invention, a polyarylene ether sulfone is used as component A. It is also possible for a mixture of two or more different polyarylene ether sulfones to be used as component A.

The arylene groups of the polyarylene ether sulfones A may be identical or different and, independently of one another, are an aromatic radical having from 6 to 18 carbon atoms. Examples of suitable arylene radicals are phenylene, bisphenylene, terphenylene, 1,5-naphthylene, 1,6-naphthylene, 1,5-anthrylene, 9,10-anthrylene and 2,6-anthrylene. Among these, preference is given to 1,4-phenylene and 4,4'-biphenylene. These aromatic radicals are preferably unsubstituted. However, they may have one or more substituents. Examples of suitable substituents are alkyl, arylalkyl, aryl, nitro, cyano and alkoxy groups, and also heteroaromatics, such as pyridine, and halogen. Preferred substituents include alkyl having up to 10 carbon atoms, such as methyl, ethyl, isopropyl, n-hexyl and isohexyl, $C_1$–$C_{10}$-alkoxy radicals, such as methoxy, ethoxy, n-propoxy and n-butoxy, aryl radicals having up to 20 carbon atoms, such as phenyl and naphthyl, and also fluorine and chlorine. Other preferred substituents are those obtainable by reacting the polyarylene ether sulfones with a reactive compound which contains, besides a carbon-carbon double or triple bond, one or more carbonyl, carboxylic acid, carboxylate, anhydride, amide, imide, carboxylic ester, amino, hydroxyl, epoxy, oxazoline, urethane, urea, lactam or halobenzyl groups. The bonding of the arylene groups to one another in the polyarylene ethers may be via —$SO_2$—, or, for example, via —O—, —S—, —SO—, —CO—, —N=N—, —COO—, or via an unsubstituted or substituted alkylene radical, or via a chemical bond.

Preferred polyarylene ether sulfones which may be used according to the invention (component A) have a structure made from repeat units of the formula I

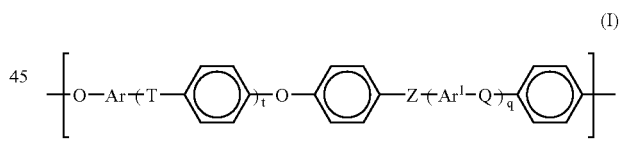

where
t and q, independently of one another, are 0, 1, 2 or 3,
each of Q, T and Z, independently of one another, is a chemical bond or a group selected from the class consisting of —O—, —S—, —$SO_2$—, S=O, C=O, —N=N—, —$R^a$C=$CR^b$— and —$CR^cR^d$—,
where
each of $R^a$ and $R^b$, independently of one another, is hydrogen or $C_1$–$C_{12}$-alkyl and each of $R^c$ and $R^d$, independently of one another, is hydrogen or $C_1$–$C_{12}$-alkyl, $C_1$–$C_{12}$-alkoxy or $C_6$–$C_{18}$-aryl, where
$R^c$ and $R^d$ may, if desired, independently of one another have fluorine and/or chlorine substituents or, together with the carbon atom to which they are bonded, may form a $C_3$–$C_{12}$-cycloalkyl group, which may be unsubstituted or substituted by one or more $C_1$–$C_6$-alkyl groups, with the proviso that at least one of the groups T, Q and Z is —$SO_2$— or C=O and if t and q are 0, Z is —$SO_2$—, and Ar and Ar¹, independently of one another, are $C_6$–$C_{18}$-arylene, unsubstituted or substituted by $C_1$–$C_{12}$-alkyl, $C_6$–$C_{18}$-aryl, $C_1$–$C_{12}$-alkoxy or halogen.

It is also possible for different units of the formula I to be present in the polyarylene ether sulfone, distributed randomly or in blocks.

One way of preparing polyarylene ethers A which may be used according to the invention is a method based on GB 1 152 035 and U.S. Pat. No. 4,870,153. Examples of suitable process conditions for the synthesis of polyarylene ether sulfones are described in EP-A-0 113 112 and EP-A-0 135 130. The reaction of the monomers in aprotic polar solvents in the presence of anhydrous alkali metal carbonate is particularly suitable. A particularly preferred combination is N-methylpyrrolidone as solvent and potassium carbonate as catalyst. The reaction in the melt is also preferred. However, the introduction of terminal anhydride groups, as they are described, is not an essential requirement for the present invention. Examples of suitable polyarylene ether sulfones A are those having at least one of the following repeat structural units $I_1$ to $I_{15}$:

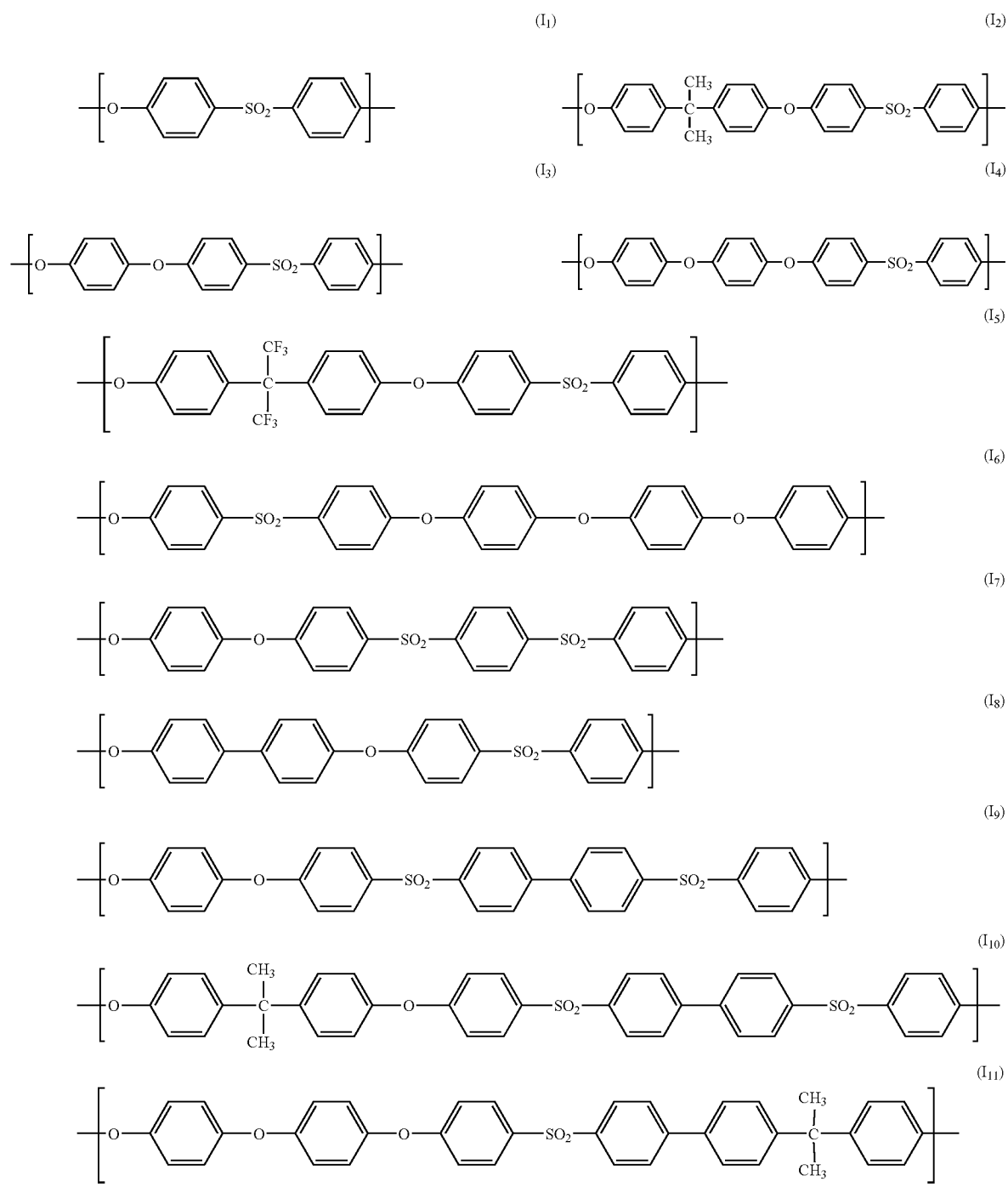

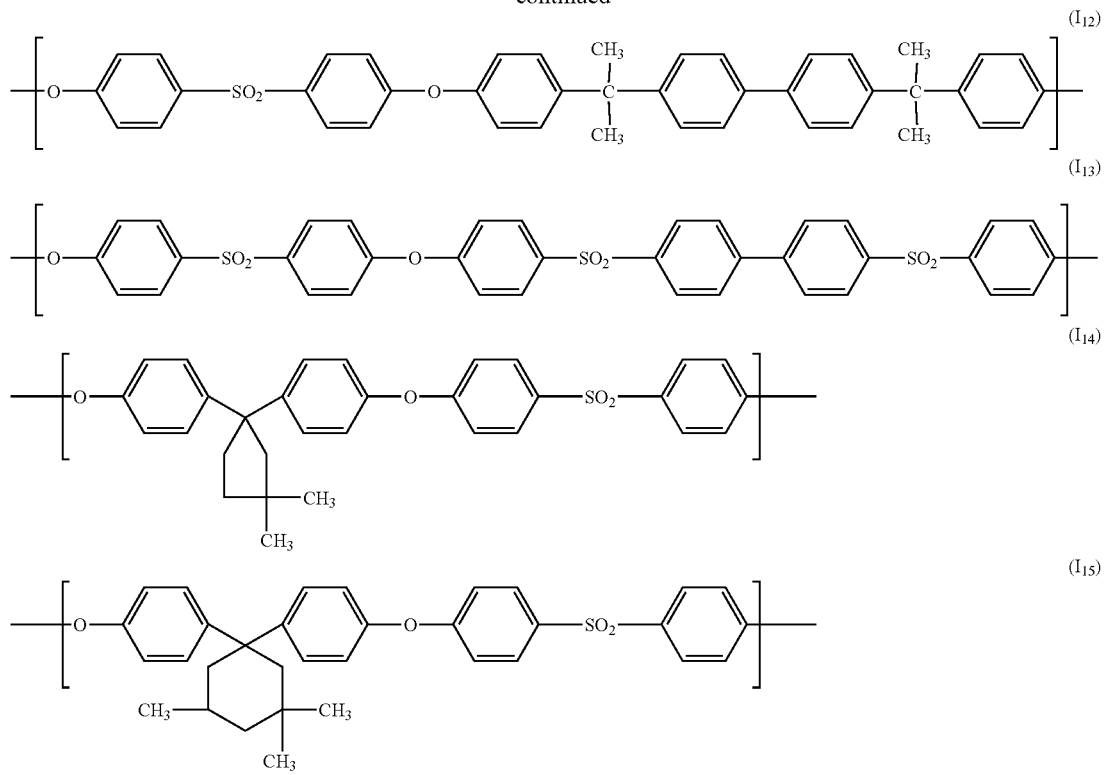

Particularly preferred units of the formula I are those of the formulae I₁ and I₂, which may be present individually or in a mixture.

Component B

The amount of component B present in the molding compositions of the invention is preferably from 0 to 15% by weight, particularly preferably from 0 (or if present, from 1) to 10% by weight. Functionalized polyaryl ether sulfones are used as component B.

The expressions "functionalized" and "having functional groups", as used in the description and in the claims, relate to the presence of functional groups which are suitable for chemical reaction with functional groups present in polyamides. In particular, these are functional groups capable of reaction with carboxyl groups or with amino groups. Examples of functional groups of this type are hydroxyl, amino, anhydride, epoxy and carboxyl groups.

In one embodiment, the preferred functionalized polyarylene ether sulfones include, particularly in mixtures with polyarylene ether sulfones which contain inert groups, carboxyl-containing polyarylene ether sulfones with repeat structural units of the formulae I and II

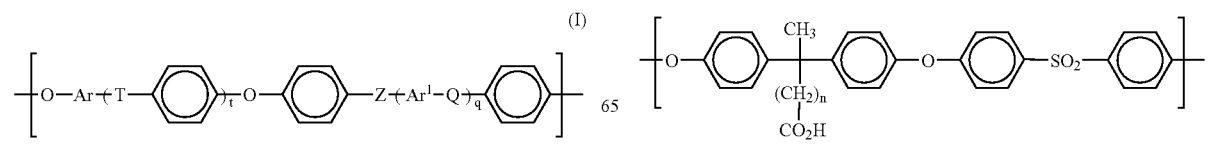

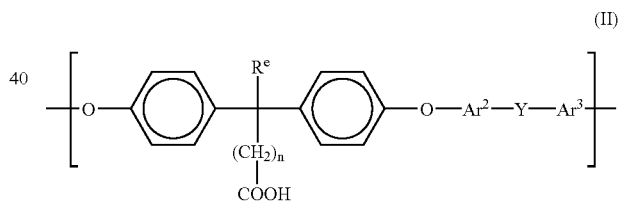

where the variables are as defined above, Y is as defined for T, Q and Z, and $Ar^2$ and $Ar^3$ are as defined for Ar and $Ar^1$, and $R^e$ is H, $C_1$–$C_6$-alkyl or —$(CH_2)_n$—COOH, where n is a number from 0 to 10.

Examples of ways of obtaining these carboxyl-containing polyarylene ethers are a method based on EP-A-0 185 237, and also the processes described by I. W. Parsons et al., in Polymer, 34, 2836 (1993) and T. Koch, H. Ritter, in Macromol. Phys. 195, 1709 (1994).

Examples of suitable structural units II are:

-continued

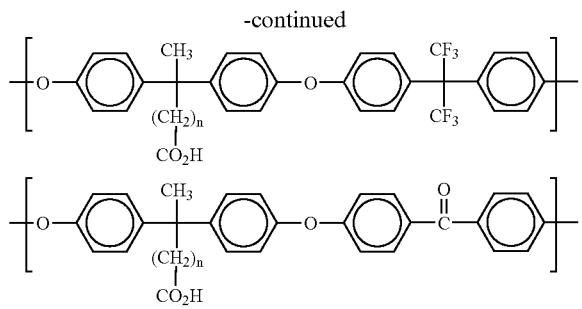

where in each case n is an integer from 0 to 4.

The polyarylene ether sulfones containing acid groups have viscosity numbers of from about 15 to 80 ml/g (determined in 1% strength NMP solution at 25° C.). If these polyarylene ether sulfones containing acid groups are used, the proportion of free acid groups in component A is preferably from 0.05 to 25 mol %, with preference from 0.1 to 20 mol %, and particularly from 0.1 to 15 mol %, the proportion of acid groups being determined by $^1$H NMR, as in I. W. Parsons et al., Polymer, 34, 2836 (1993).

The polyarylene ether sulfones A and B may also be copolymers or block copolymers, in which there are polyarylene ether sulfone segments and segments of other thermoplastic polymers, such as polyesters, aromatic polycarbonates, polyester carbonates, polysiloxanes, polyimides or polyetherimides. The molar masses (number average) of the blocks or of the graft branches in the copolymers are generally from 1000 to 30,000 g/mol.

The blocks of different structure may have an alternating or random arrangement. The proportion by weight of the polyarylene ether sulfones in the copolymers or block copolymers is generally at least 10% by weight. The proportion by weight of the polyarylene ether sulfones may be up to 97% by weight. Preference is given to copolymers or block copolymers with a proportion of up to 90% by weight of polyarylene ether sulfones. Particular preference is given to copolymers or block copolymers having from 20 to 80% by weight of polyarylene ether sulfones.

The average molar masses $M_n$ (number average) of the polyarylene ether sulfones are generally from 5000 to 60,000 g/mol, and their relative viscosities are generally from 0.20 to 0.95 dl/g. Depending on the solubility of the polyarylene ether sulfones, the relative viscosities are measured either in 1% strength by weight N-methylpyrrolidone solution, in mixtures made from phenol and dichlorobenzene, or in 96% strength sulfuric acid, in each case at 20 or 25° C.

Depending on the conditions for the synthesis, the polyarylene ether sulfones A and B may have various end groups. These include those which are inert to component C and those which can react with functional groups of the polyamides C, in particular with the amino or carboxyl groups.

Inert end groups include halo, in particular chloro, alkoxy, particularly methoxy or ethoxy, aryloxy, preferably phenoxy, and benzyloxy groups. Examples of reactive groups are hydroxyl, amino, anhydride, epoxy and carboxyl. Particular preference is given to polyarylene ether sulfones B having amino, anhydride or epoxy end groups, or mixtures of these.

One way of preparing polyarylene ether sulfones B having hydroxyl end groups is to select an appropriate molar ratio of dihydroxy and dichloro monomers (see, for example, McGrath et al., Polym. Eng. Sci. 17, 647 (1977); Elias "Makromoleküle" 4th edn. (1981) pp. 490–493, Hütig & Wepf-Verlag, Basle).

One way of obtaining polyarylene ether sulfones B having amino end groups is for compounds such as p-aminophenol to be present during the polymerization (J. E. McGrath, Polymer 30, 1552 (1989)).

An example of a description of the preparation of polyarylene ether sulfones B containing anhydride end groups is given in DE-A 44 29 107.

Polyarylene ether sulfones B having epoxy end groups may be prepared from polyarylene ether sulfones having OH end groups, for example by reacting the latter with suitable compounds which have propylene oxide groups, or from which propylene oxide groups are obtainable, preferably epichlorohydrin.

The reaction of the hydroxyl-terminated polyarylene ether sulfones with epichlorohydrin preferably takes place at from 30 to 200° C., in a solvent. Examples of suitable solvents for this purpose are aliphatic or aromatic sulfides or sulfones, or else N-methylpyrrolidone. The reaction is generally carried out in a weakly basic medium in order to prevent, as far as possible, ring-opening of the epoxy groups.

In one embodiment, the molding compositions of the invention comprise only polyarylene ether sulfones A which are substantially free from reactive end groups. However, it is also possible in a preferred embodiment to use mixtures of various polyarylene ether sulfones A and B having inert and reactive end groups. An example of the proportion of the polyarylene ether sulfones having reactive end groups is from 2 to 98% by weight, preferably from 5 to 50% by weight, based on components A and B.

Component C

The amount of component C present in the molding compositions of the invention is from 5 to 94.8% by weight, preferably from 10 to 80% by weight, particularly from 10 to 50% by weight and specifically from 15 to 25% by weight. This material is at least one polyamide. The polyamide here may be freely selected from polyamides and copolyamides. The materials are thermoplastic polyamides.

The polyamides present as component C in the compositions are likewise known and embrace semicrystalline and amorphous resins with a molecular weight (weight average) of at least 5000, these usually being termed nylon. Polyamides of this type are described in U.S. Pat. Nos. 2,071,250; 2,071,251; 2,130,523; 2,130,948; 2,241,322; 2,312,966; 2,512,606 and 3,393,210, for example.

One way of preparing the polyamides C is to condense equimolar amounts of a saturated or of an aromatic dicarboxylic acid having from 4 to 12 carbon atoms with a saturated or aromatic diamine which has up to 14 carbon atoms, or to condense ω-aminocarboxylic acids, or to carry out polyaddition of appropriate lactams.

Examples of polyamides of this type are polyhexamethyleneadipamide (nylon-6,6), polyhexamethyleneazelamide (nylon-6,9), polyhexamethylenesebacamide (nylon-6,10), polyhexamethylenedodecandiamide (nylon-6,12), the polyamides obtained by ring-opening of lactams, for example polycaprolactam and polylaurolactam, and also poly-11-aminoundecanoic acid, and a polyamide made from di(p-aminocyclohexyl)methane and dodecanedioic acid.

It is also possible to use polyamides prepared by copoly-condensing two or more of the abovementioned monomers or their components, e.g. copolymers made from adipic acid, isophthalic acid or terephthalic acid and hexamethylenediamine, or copolymers made from caprolactam, terephthalic acid and hexamethylenediamine. Partly aromatic copolyamides of this type contain from 40 to 90% by weight of units which derive from terephthalic acid and hexamethylenediamine. A small proportion of the terephthalic acid, preferably not more than 10% by weight of the total of aromatic dicarboxylic acids used, may be replaced by isophthalic acid or by other aromatic dicarboxylic acids, preferably those in which the carboxyl groups are in para position.

Other monomers which may be used are cyclic diamines, such as those of the formula III

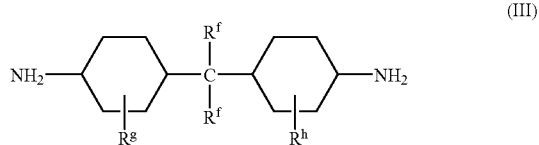

where
$R^f$ is hydrogen or $C_1$–$C_4$-alkyl,
$R^g$ is $C_1$–$C_4$-alkyl or hydrogen, and
$R^h$ is $C_1$–$C_4$-alkyl or hydrogen.

Particularly preferred diamines III are bis(4-aminocyclohexyl)methane, bis(4-amino-3-methylcyclohexyl)methane, 2,2-bis(4-aminocyclohexyl)propane, and 2,2-bis(4-amino-3-methylcyclohexyl)propane.

Other diamines III which may be mentioned are 1,3- and 1,4-cyclohexanediamine, and isophoronediamine.

Besides the units which derive from terephthalic acid and hexamethylenediamine, the partly aromatic copolyamides contain units which derive from ε-caprolactam, and/or units which derive from adipic acid and hexamethylenediamine.

The proportion of units which derive from the ε-caprolactam is up to 50% by weight, preferably from 20 to 50% by weight, particularly from 25 to 40% by weight, while the proportion of units which derive from adipic acid and hexamethylenediamine is up to 60% by weight, preferably from 30 to 60% by weight, and particularly from 35 to 55% by weight.

It is also possible for the copolyamides to contain both units derived from ε-caprolactam and units derived from adipic acid and hexamethylenediamine. In this case, care needs to be taken that the proportion of units free from aromatic groups is at least 10% by weight, preferably at least 20% by weight. There is no particular restriction here on the ratio of the units derived from ε-caprolactam and from adipic acid and hexamethylenediamine.

Polyamides having from 50 to 80% by weight, particularly from 60 to 75% by weight, of units derived from terephthalic acid and hexamethylenediamine, and from 20 to 50% by weight, preferably from 25 to 40% by weight, of units which derive from ε-caprolactam have proven to be particularly advantageous for many applications.

One way of preparing the partly aromatic copolyamides is the process described in EP-A-0 129 195 and EP-A-0 129 196.

Preferred partly aromatic polyamides are those whose content of triamine units, in particular units of dihexamethylenetriamine, is below 0.5% by weight. Particular preference is given to partly aromatic polyamides of this type having triamine contents of 0.3% by weight or below.

Preference is given to linear polyamides with a melting point above 200° C.

Preferred polyamides are polyhexamethyleneadipamide, polyhexamethylenesebacamide and polycaprolactam, and also nylon-6/6,T and nylon-6,6/6,T, and also polyamides which contain cyclic diamines as comonomers. The polyamides generally have a relative viscosity of from 2.0 to 5, determined on a 1% strength by weight solution in 96% strength sulfuric acid at 23° C., corresponding to a molecular weight (number average) of from about 15,000 to 45,000. It is particularly preferable to use polyamides with a relative viscosity of from 2.4 to 3.5, in particular from 2.5 to 3.4.

Mention should also be made of polyamides obtainable, for example, by condensing 1,4-diaminobutane with adipic acid at an elevated temperature (nylon-4,6). Preparation processes for polyamides of this structure are described in EP-A-0 038 094, EP-A-0 038 582 and EP-A-0 039 524, for example.

Other suitable copolyamides C according to the invention are essentially composed of c1: from 30 to 44 mol %, preferably from 32 to 40 mol %, and particularly from 32 to 38 mol %, of units $C_1$ which derive from terephthalic acid, c2: from 6 to 20 mol %, preferably from 10 to 18 mol %, and particularly from 12 to 18 mol %, of units $C_2$ which derive from isophthalic acid, c3: from 43 to 49.5 mol %, preferably from 46 to 48.5 mol %, and particularly from 46.3 to 48.2 mol %, of units $C_3$ which derive from hexamethylenediamine, c4: from 0.5 to 7 mol %, preferably from 1.5 to 4 mol %, and particularly from 1.8 to 3.7 mol %, of units $C_4$ which derive from aliphatic cyclic diamines having from 6 to 30 carbon atoms, preferably from 13 to 29 carbon atoms, and particularly from 13 to 17 carbon atoms, preferably having the abovementioned formula III, and c5: from 0 to 4 mol % of polyamide-forming monomers $C_5$ other than $C_1$–$C_4$, where the molar percentages of components $C_1$ to $C_5$ give 100% in total.

It is preferable for the amounts of the diamine units $C_3$ and $C_4$ reacted with the dicarboxylic acid units $C_1$ and $C_2$ to be approximately equimolar.

Besides the units $C_1$ to $C_4$ described above, the copolyamides C may contain, based on components $C_1$ to $C_4$, up to 4% by weight, preferably up to 3.5% by weight, of other polyamide-forming monomers $C_5$.

Examples of aromatic dicarboxylic acids are substituted terephthalic and isophthalic acids, such as 3-tert-butylisophthalic acid, polynuclear dicarboxylic acids, e.g. 4,4'- and 3,3'-biphenyldicarboxylic acid, 4,4'- and 3,3'-diphenylmethanedicarboxylic acid, 4,4'- and 3,3'-diphenyl sulfone dicarboxylic acid, 1,4- and 2,6-naphthalenedicarboxylic acid, and phenoxyterephthalic acid.

Examples of other polyamide-forming monomers $C_5$ may derive from dicarboxylic acids having from 4 to 16 carbon atoms and from aliphatic diamines having from 4 to 16 carbon atoms, or else from aminocarboxylic acids or, respectively, corresponding lactams having from 7 to 12 carbon atoms. Suitable monomers of these types which may be mentioned here, merely as examples, are suberic acid, azelaic acid and sebacic acid as representatives of the aliphatic dicarboxylic acids, 1,4-butanediamine, 1,5-pentanediamine and piperazine as representatives of the diamines, and caprolactam, capryllolactam, enantholactam, laurolactam and ω-aminoundecanoic acid as representatives of lactams and aminocarboxylic acids.

The melting points of these copolyamides C are generally from 290 to 340° C., preferably from 292 to 330° C., this melting point generally being associated with a high glass transition point, generally above 120° C., particularly above 130° C. (in the dry state).

According to the invention, it is preferable to use polyamides C whose degree of crystallinity is >30%, preferably >35%, and particularly >40%.

The degree of crystallinity is a measure of the proportion of crystalline fragments in the copolyamide, and is determined by X-ray diffraction, or indirectly by measuring $\Delta H_{cryst}$.

It is, of course, also possible to use mixtures of these copolyamides C, with any desired mixing ratio.

Suitable processes for preparing the copolyamides are known to the skilled worker (see also EP-A-0 702 058).

The viscosity number of the polyamides or copolyamides of component C used according to the invention, measured in 96% strength sulfuric acid, 0.5% strength solution, in accordance with DIN 53 727, is preferably above 140 ml/g, with preference above 150 ml/g.

Component D

As component D, the molding compositions of the invention comprise from 0.1 to 10% by weight, preferably from 0.3 to 8% by weight, particularly from 0.5 to 2% by weight, of at least one epoxy resin. Any known epoxy resin may be used here. A comprehensive description of epoxy resins may be found in B. Ellis (ed.), Chemistry and Technology of Epoxy Resins, Blackie Academic & Professional 1993.

Preferred epoxy resins are those of the formula II, usually obtainable by condensing 2,2-bis(p-hydroxyphenyl)propane (bisphenol A) and epichlorohydrin.

They preferably have the formula II D below:

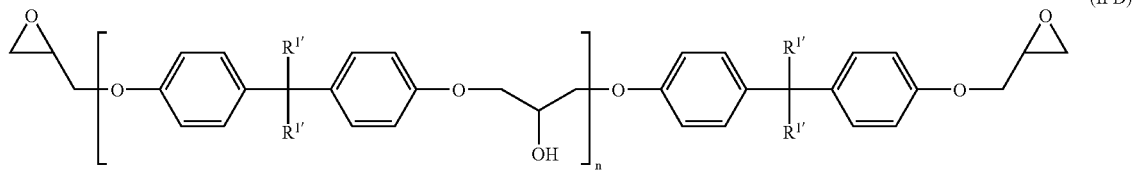

where $R^1$ is hydrogen, or alkyl having from 1 to 16 carbon atoms, preferably methyl, and n is from 2 to 50, preferably from 2 to 13.

The epoxy value to ISO 3001 of epoxy resins is usually from 1.5 to 1.9, preferably from 1.68 to 1.75. Their softening point to DIN 51920 is preferably from 75 to 100° C., and particularly from 82 to 90° C. Their melt viscosity to DIN 53018 Ti at 175° C. is preferably from 250 to 600 mPas, particularly from 350 to 480 mPas.

Other preferred epoxy resins are those of the formula III D

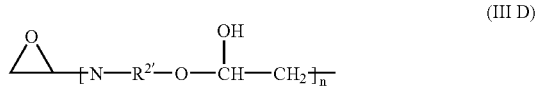

where n is as defined for II D and $R^{2'}$ is alkyl having from 1 to 16 carbon atoms.

Preferred $R^{2'}$ are propyl and butyl.

Other suitable epoxy resins have the formula IV D

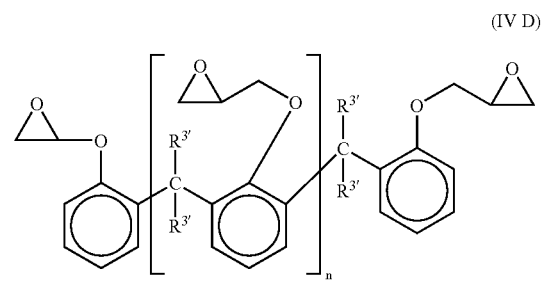

where $R^{3'}$ and n are as defined under formula II for $R^{1'}$ and n, $R^{3'}$ preferably being hydrogen.

Cycloaliphatic epoxy resins (formula V D) are also suitable:

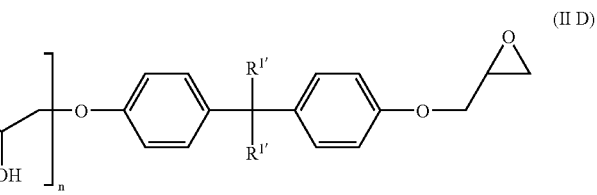

where $R^{4'}$ is alkyl having from 1 to 16 carbon atoms. Other preferred resins which should be mentioned are condensation products of alcohols, particularly of diols and/or of bisphenols, with triglycidyl isocyanurate.

It is preferable to use solid epoxy resins whose softening point, determined to DIN 51920, is above 60° C., preferably above 70° C. However, liquid or semi-solid resins may also be used.

Component E

The molding compositions of the invention comprise from 0.1 to 60% by weight of fibrous or particulate fillers or mixtures of these. It is preferable for the molding compositions of the invention to comprise from 4.7 to 50% by weight, and particularly from 1.5 to 40% by weight, of fibrous or particulate fillers (or reinforcing materials) or a mixture of these.

Preferred fibrous fillers or fibrous reinforcing materials are carbon fibers, potassium titanate whiskers, aramid fibers and particularly glass fibers. If glass fibers are used they may have been provided with a size, preferably a polyurethane size, and with a coupling agent, to improve compatibility with the matrix material. The carbon fibers and glass fibers used generally have a diameter of from 6 to 20 μm.

The glass fibers may be incorporated either as short glass fibers or else as continuous-filament strands (rovings). The average length of the glass fibers in the finished injection molding is preferably from 0.08 to 0.5 mm.

Carbon fibers or glass fibers may also be used as wovens, mats or glass filament rovings.

Suitable particulate fillers are amorphous silica, carbonates, such as magnesium carbonate or chalk, powdered quartz, mica, a very wide variety of silicates, such as clays, muscovite, biotite, suzoite, tin maletite, talc, chlorite, phlogophite, feldspar, calcium silicates, such as wollastonite, or aluminum silicates, such as kaolin, particularly calcined kaolin.

In one particularly preferred embodiment, use is made of particulate fillers in which at least 95% by weight, preferably at least 98% by weight, of the particles have a diameter (maximum dimension), determined on the finished product, of less than 45 µm, preferably less than 40 µm, and an aspect ratio, determined on the finished product, of from 1 to 25, preferably from 2 to 20.

One way of determining the particle diameters here is by taking electron micrographs of cross sections of the polymer mixture and using at least 25, preferably at least 50, filler particles for the evaluation. The particle diameters may also be determined by sedimentation analysis as in Transactions of ASAE, p. 491 (1983). The proportion by weight of fillers below 40 µm may also be measured by screen analysis. The aspect ratio is the ratio of particle diameter to thickness (largest to smallest dimension).

Particularly preferred particulate fillers are talc, kaolin, such as calcined kaolin, and wollastonite, and mixtures of two or all of these fillers. Among these, particular preference is given to talc with a proportion of at least 95% by weight of particles of diameter less than 40 µm, and with an aspect ratio of from 1.5 to 25, determined in each case on the finished product. Kaolin preferably has a proportion of at least 95% by weight of particles of diameter less than 20 µm, and with an aspect ratio of from 1.2 to 20, determined in each case on the finished product.

Component F

The molding compositions of the invention may, if desired, comprise impact-modifying rubbers F, which have functional groups. Their proportion may vary over a wide range. Preferred molding compositions of the invention comprise from 0 to 30% by weight, particularly from 0 to 20% by weight, of component F, based on the total weight of A–G. Particularly preferred molding compositions comprise from 0 to 17.5% by weight of component F, based on the total weight of A to G.

Mixtures of two or more different impact-modifying rubbers may also be used as component F.

Rubbers which increase the toughness of molding compositions generally have two significant features: they comprise an elastomeric fraction which has a glass transition temperature below −10° C., preferably below −30° C., and they contain at least one functional group which can interact with the polyamide or polyaryl ether. Examples of suitable functional groups are carboxylic acid, carboxylic anhydride, carboxylic ester, carboxamide, carboximide, amino, hydroxyl, epoxy, urethane and oxazoline groups.

Preferred functionalized rubbers include functionalized polyolefin rubbers built up from the following components:

$f_1$) from 40 to 99% by weight of at least one α-olefin having from 2 to 8 carbon atoms;

$f_2$) from 0 to 50% by weight of a diene;

$f_3$) from 0 to 45% by weight of a $C_1$–$C_{12}$-alkyl ester of acrylic acid or methacrylic acid, or mixtures of esters of this type;

$f_4$) from 0 to 40% by weight of an ethylenically unsaturated $C_2$–$C_{20}$ mono- or dicarboxylic acid or of a functional derivative of an acid of this type;

$f_5$) from 1 to 40% by weight of a monomer containing epoxy groups; and $f_6$) from 0 to 5% by weight of other monomers capable of free-radical polymerization.

Examples of suitable α-olefins $f_1$) are ethylene, propylene, 1-butylene, 1-pentylene, 1-hexylene, 1-heptylene, 1-octylene, 2-methylpropylene, 3-methyl-1-butylene and 3-ethyl-1-butylene. Ethylene and propylene are preferred.

Examples of suitable diene monomers $f_2$) are conjugated dienes having from 4 to 8 carbon atoms, such as isoprene and butadiene, nonconjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0.2.6]-3,8-decadiene, or mixtures of these. Preference is given to 1,5-hexadiene, 5-ethylidenenorbornene and dicyclopentadiene. The diene content is preferably from 0.5 to 50% by weight, in particular from 2 to 20% by weight and particularly preferably from 3 to 15% by weight, based on the total weight of the olefin polymer.

Examples of suitable esters $f_3$) are methyl, ethyl, propyl, n-butyl, isobutyl, 2-ethylhexyl, octyl and decyl acrylates and the corresponding methacrylates. Among these preference is given to methyl, ethyl, propyl, n-butyl and 2-ethylhexyl acrylate and methacrylate.

Instead of the esters $f_3$), or in addition to these, the olefin polymers may also comprise acid-functional and/or latently acid-functional monomers derived from ethylenically unsaturated mono- or dicarboxylic acids $f_4$).

Examples of monomers $f_4$) are acrylic acid, methacrylic acid, tertiary alkyl esters of these acids, in particular tert-butyl acrylate, and dicarboxylic acids, such as maleic acid and fumaric acid, and derivatives of these acids, and also their half esters.

For the purposes of the invention, latently acid-functional monomers are those compounds which under the conditions of the polymerization or during incorporation of the olefin polymers into the molding compositions form free acid groups. Examples of these are anhydrides of dicarboxylic acids having from 2 to 20 carbon atoms, in particular maleic anhydride, and tertiary $C_1$–$C_{12}$-alkyl esters of the above-mentioned acids, in particular tert-butyl acrylate and tert-butyl methacrylate.

Ethylenically unsaturated dicarboxylic acids and anhydrides $f_4$) have the following formulae IV and V:

$$R^2C(COOR^3)=C(COOR^4)R^5 \qquad (IV)$$

(V)

where $R^2$, $R^3$, $R^4$ and $R^5$, independently of one another, are H or $C_1$–$C_6$-alkyl.

Monomers $f_5$) containing epoxy groups have the following formulae VI and VII

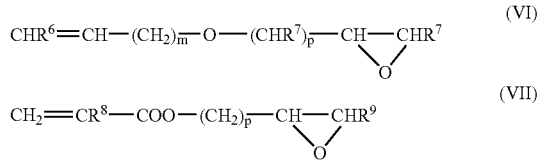

where $R^6$, $R^7$, $R^8$ and $R^9$, independently of one another, are H or $C_1$–$C_6$-alkyl, m is an integer from 0 to 20, and p is an integer from 0 to 10.

$R^2$ to $R^9$ are preferably hydrogen, m is preferably 0 or 1 and p is preferably 1.

Preferred compounds $f_4$) and, respectively, $f_5$) are maleic acid, fumaric acid and maleic anhydride and, respectively, alkenyl glycidyl ethers and vinyl glycidyl ether.

Particularly preferred compounds of the formulae IV and V and, respectively, VI and VII are maleic acid and maleic anhydride and, respectively, acrylates and/or methacrylates both of which contain epoxy groups, in particular glycidyl acrylate and glycidyl methacrylate.

Particularly preferred olefin polymers are those made from

| | |
|---|---|
| from 50 to 98.9% | by weight, in particular from 60 to 94.85% by weight, of ethylene, and |
| from 1 to 50% | by weight, in particular from 5 to 40% by weight, of an ester of acrylic or methacrylic acid, and |
| from 0.1 to 20.0% | by weight, in particular from 0.15 to 15% by weight, of glycidyl acrylate and/or glycidyl methacrylate, acrylic acid and/or maleic anhydride. |

Particularly suitable functionalized rubbers F are
ethylene-methyl methacrylate-glycidyl methacrylate polymers,
ethylene-methyl acrylate-glycidyl methacrylate polymers,
ethylene-methyl acrylate-glycidyl acrylate polymers and
ethylene-methyl methacrylate-glycidyl acrylate polymers.

Examples of other monomers $f_6$) are vinyl esters and vinyl ethers.

The polymers described above may be prepared by processes known per se, preferably by random copolymerization at high pressure and elevated temperature.

The melt index of the copolymers is generally from 1 to 80 g/10 min (measured at 190° C. and 2.16 kg load).

Core-shell graft rubbers are another group of suitable rubbers. These are graft rubbers prepared in emulsion and composed of at least one hard and one soft constituent. Usually, a hard constituent is a polymer with a glass transition temperature of at least 25° C., and a soft constituent is a polymer with a glass transition temperature of not more than 0° C. These products have a structure made from a core and from at least one shell, and the structure is a result of the sequence of addition of the monomers. The soft constituents generally derive from butadiene, isoprene, alkyl acrylates, alkyl methacrylates or siloxanes and, if desired, other comonomers. Suitable siloxane cores may be prepared, for example, starting from cyclic oligomeric octamethyltetrasiloxane or from tetravinyltetramethyltetrasiloxane. These may, for example, be reacted with γ-mercaptopropylmethyldimethoxysilane in a ring-opening cationic polymerization, preferably in the presence of sulfonic acids, to give the soft siloxane cores. The siloxanes may also be crosslinked by, for example, carrying out the polymerization in the presence of silanes having hydrolyzable groups, such as halo or alkoxy, for example tetraethoxysilane, methyltrimethoxysilane or phenyltrimethoxysilane. Examples of suitable comonomers for this are styrene, acrylonitrile and crosslinking or grafting monomers having more than one polymerizable double bond, for example diallyl phthalate, divinylbenzene, butanediol diacrylate and triallyl (iso)cyanurate. The hard constituents generally derive from styrene, α-methylstyrene or from copolymers of these, and preferred comonomers here are acrylonitrile, methacrylonitrile and methyl methacrylate.

Preferred core-shell graft rubbers comprise a soft core and a hard shell or a hard core, a first soft shell and at least one further hard shell. The incorporation of functional groups here, such as carbonyl, carboxylic acid, anhydride, amide, imide, carboxylic ester, amino, hydroxyl, epoxy, oxazoline, urethane, urea, lactam or halobenzyl, preferably takes place by adding suitably functionalized monomers during the polymerization of the final shell. Examples of suitable functionalized monomers are maleic acid, maleic anhydride, half esters or diesters, or maleic acid, tert-butyl (meth)acrylate, acrylic acid, glycidyl (meth)acrylate and vinyloxazoline. The proportion of monomers with functional groups is generally from 0.1 to 25% by weight, preferably from 0.25 to 15% by weight, based on the total weight of the core-shell graft rubber. The weight ratio of soft to hard constituents is generally from 1:9 to 9:1, preferably from 3:7 to 8:2.

Rubbers of this type are known per se and are described, for example, in EP-A-0 208 187. One way of incorporating oxazine groups for functionalization is as in EP-A-0 791 606.

Thermoplastic polyester elastomers are another group of suitable impact modifiers. For the purposes of the invention, polyester elastomers are segmented copolyetheresters which comprise long-chain segments generally deriving from poly(alkylene) ether glycols and short-chain segments deriving from low-molecular-weight diols and dicarboxylic acids. Products of this type are known per se and are described in the literature, for example in U.S. Pat. No. 3,651,014. Corresponding products are also available commercially as Hytrel® (Du Pont), Arnitel® (Akzo) and Pelprene® (Toyobo Co. Ltd.).

It is also, of course, possible to use mixtures of various rubbers.

Component G

The amount of component G present in the molding compositions of the invention is from 0 to 40% by weight, preferably from 0 to 20% by weight, with preference from 0 to 10% by weight, and in the case of stabilizers particularly from 0 to 1% by weight.

Component G comprises the usual additives and processing aids for polyamide blends. Examples which should be mentioned of additives of this type are: dyes, pigments, colorants, antistats, antioxidants, stabilizers to improve heat resistance, to increase light resistance, or to raise hydrolysis resistance or chemicals resistance, agents to inhibit decomposition caused by heat, and in particular the lubricants useful for producing moldings. These other additives may be metered in at any stage of the preparation process, but preferably at an early stage, so that the stabilizing effects (or other specific effects) of the additive are utilized at an early juncture. In polyphenyl ether blends use may particularly be made of flame retardants, for example. Examples of suitable flame retardants are polyhalobiphenyl, polyhalodiphenyl ether, polyhalophthalic acid, and derivatives thereof, and polyhalooligo- and -polycarbonates, the corresponding bromine compounds being particularly effective.

Examples of these are polymers of 2,6,2',6'-tetrabromobisphenol A, of tetrabromophthalic acid, of 2,6-dibromophenol and of 2,4,6-tribromophenol, and derivatives of these. Preferred flame retardant is elemental phosphorus. The elemental phosphorus may generally be coated or phlegmatized, for example with polyurethanes or amino plastics.

Concentrates of red phosphorus, for example in a polyamide, in elastomers or in polyolefins, are also suitable. Particular preference is given to combinations of elemental phosphorus with 1,2,3,4,7,8,9,10,13,13,14,14-dodecachloro-1,4,4a,5,6,6a,7,10,10a,11,12,12a-dodecahydro-1,4:7,10-dimethanodibenzo(a,e)cyclooctane (Dechlorane®Plus, Occidental Chemical Corp.), and, where appropriate, with a synergist, such as antimony trioxide. Phosphorus compounds, such as organic phosphates, phosphonates, phosphinates, phosphine oxides, phosphines or phosphites, are also preferred. Examples which should be mentioned are triphenylphosphine oxide and triphenyl phosphate. This material may be used alone or mixed with hexabromobenzene or with a chlorinated biphenyl and, if desired, antimony oxide. Typical preferred phosphorus compounds which may be used according to the present invention are those of the formula

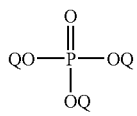

where Q are identical or different hydrocarbon radicals, such as alkyl, cycloalkyl, aryl, alkyl-substituted aryl or aryl-substituted alkyl, or halogen, hydrogen, or combinations of these, with the proviso that at least one of the radicals Q is aryl.

Examples of suitable phosphates of this type are the following:
phenyl bisdodecyl phosphate, phenyl bisneopentyl phosphate, phenyl ethyl hydrogenphosphate, phenyl bis(3,5,5-trimethylhexyl) phosphate, ethyl diphenyl phosphate, 2-ethylhexyl di(p-tolyl) phosphate, bis(2-ethylhexyl) phenyl phosphate, tri(nonylphenyl) phosphate, phenyl methyl hydrogenphosphate, di(dodecyl) p-tolyl phosphate, tricresyl phosphate, triphenyl phosphate, dibutyl phenyl phosphate and diphenyl hydrogenphosphate. Preferred phosphates are those where each Q is aryl. The most preferred phosphate is triphenyl phosphate. Preference is also given to the combination of triphenyl phosphate with hexabromobenzene and antimony trioxide.

Other compounds suitable as flame retardants are those which contain phosphorus-nitrogen bonds, for example phosphonitrile chloride, phosphoric ester amides, phosphoric ester amines, phosphoramides, phosphonamides, tris(aziridinyl)phosphine oxide and tetrakis(hydroxymethyl) phosphonium chloride. Most of the flame retardants are commercially available.

Other suitable flame retardants are hydroxides of magnesium, where appropriate coated with silane compounds.

Other halogen-containing flame retardants are tetrabromobenzene, hexachlorobenzene and hexabromobenzene, and halogenated polystyrenes and polyphenylene ethers.

The halogenated phthalimides described in DE-A-19 46 924 may also be used. Of these, N,N'-ethylenebistetrabromophthalimide has gained particular importance.

Examples of other usual additives are stabilizers and oxidation inhibitors, agents to inhibit decomposition caused by heat or decomposition caused by ultraviolet light, lubricants, mold-release agents, dyes, pigments and plasticizers.

Examples of oxidation retarders and heat stabilizers which may be added to the molding compositions of the invention are halides of metals of group I of the Periodic Table, e.g. sodium halides, potassium halides and lithium halides, where appropriate in combination with copper(I) halides, e.g. with chlorides, bromides or iodides. Zinc fluoride and zinc chloride may also be used. It is also possible to use sterically hindered phenols, hydroquinones, substituted members of this group, or mixtures of these compounds, preferably in concentrations of up to 1% by weight, based on the weight of the mixture.

Examples of UV stabilizers are various substituted resorcinols, salicylates, benzotriazoles and benzophenones, usually used in amounts of up to 23% by weight.

The lubricants and mold-release agents, generally used in amounts of up to 1% by weight of the molding composition, are stearic acid, stearyl alcohol, alkyl stearates and stearamides, and also esters of pentaerythritol with long-chain fatty acids.

The additives also include stabilizers which inhibit the decomposition of the red phosphorus in the presence of moisture and atmospheric oxygen. Examples of these which should be mentioned are compounds of cadmium, of zinc, of aluminum, of silver, of iron, of copper, of antimony, of tin, of magnesium, of manganese, of vanadium, of boron and of titanium. Examples of particularly suitable compounds are oxides of the metals mentioned, and also carbonates and oxycarbonates, hydroxides, and also salts of organic or of inorganic acids, for example acetates or phosphates or hydrogenphosphates, or sulfates.

A preferred stabilizer which may be present in the molding compositions of the invention is at least one phosphorus-containing inorganic acid or derivatives thereof, in amounts of up to 1000 ppm, preferably from 30 to 200 ppm, and particularly from 50 to 130 ppm, based on the phosphorus content of the compounds.

Preferred acids are hypophosphorous acid, phosphorous acid and phosphoric acid, and also salts thereof with alkali metals, particularly preferably sodium or potassium. Among organic derivatives of these acids preference is given to ester derivatives of abovementioned acids with fatty acids, the fatty acids having from 12 to 44 carbon atoms, preferably from 22 to 40 carbon atoms. Examples of these which should be mentioned are stearic acid, behenic acid, palmitic acid and montanic acid.

Nucleating agents which may be used are sodium phenylphosphinate, aluminum oxide, silicon dioxide, nylon-2,2, and also preferably talc.

Lubricants and mold-release agents, usually used in amounts of up to 1% by weight, are preferably long-chain fatty acids (such as stearic acid or behenic acid), their salts (such as Ca stearate or Zn stearate) or ester derivatives (such as stearyl stearate or pentaerythritol tetrastearate), or else amide derivatives (such as ethylenebisstearylamide).

Examples which should be mentioned of plasticizers are dioctyl phthalate, dibenzyl phthalate, butyl benzyl phthalate, hydrocarbon oils, N-(n-butyl)benzenesulfonamide, and o- and p-tolylethylsulfonamide.

Pigments and dyes are generally present in amounts of up to 4% by weight, preferably from 0.5 to 3.5% by weight, and particularly from 0.5 to 3% by weight.

The pigments for coloration of thermoplastics are well known, see for example R. Gächter and H. Müller, Taschenbuch der Kunststoffadditive, Carl Hanser Verlag, 1983, pp. 494–510. A first preferred group of pigments is that of white pigments, such as zinc oxide, white lead ($2PbCO_3.Pb(OH)_2$), lithopones, antimony white and titanium dioxide. Of the two most common crystal forms of titanium dioxide (rutile and anatase) it is the rutile form in particular which is used for white coloration of the molding compositions of the invention.

Black pigments which may be used according to the invention are iron oxide black ($Fe_3O_4$), spinel black ($Cu(Cr,Fe)_2O_4$), manganese black (a mixture of manganese dioxide, silica and iron oxide), cobalt black and antimony black, and particularly preferably carbon black, usually used in the form of furnace black or gas black (see in this connection G. Benzing, Pigmente für Anstrichmittel, Expert-Verlag (1988), pp. 78ff.).

Inorganic color pigments, such as chromium oxide green, or organic color pigments, such as azo pigments and phthalocyanines, may, of course, be used according to the invention to achieve particular shades of color. Pigments of this type are widely available commercially.

It can also be advantageous to use the pigments or dyes mentioned in mixtures, such as carbon black with copper phthalocyanines, this method generally making it easier to disperse the color in the thermoplastic.

Component H

As component H, use is made of from 100 ppm to 0.5% by weight, preferably from 0.001 to 0.1% by weight, particularly from 0.005 to 0.02% by weight, of copper bromide and/or copper iodide, based on components A to G.

The molding compositions of the invention may be prepared by known processes, by mixing components A, C, D, E, H and, where appropriate, B, F and G.

The sequence of mixing the components may be as desired. For example, the molding compositions of the invention may be prepared by extrusion, one way being to mix the starting components in conventional mixing equipment, such as screw extruders, preferably twin-screw extruders, Brabender mixers or Banburry mixers, or in kneaders, followed by extrusion. The extrudate is cooled and comminuted. The sequence of mixing the components may be varied, for example two or, where appropriate, three components may be premixed. However, it is also possible for all of the components to be mixed together.

To obtain very homogeneous mixing, intensive mixing is advantageous. For this, the average mixing times required are generally from 0.2 to 30 minutes at from 280 to 370° C., preferably from 290 to 360° C. The extrudate is generally cooled and comminuted.

The molding compositions of the invention have very good heat resistance up to 150° C., and also improved flowability and impact strength.

The examples below further illustrate the invention.

EXAMPLES

The viscosity number of the polyaryl ethers is determined in 1% strength solution in N-methylpyrrolidone at 25° C. The proportion of units having acid groups in the copolyaryl ethers C) was determined by $^1$H NMR spectroscopy, as in I. W. Parsons et al., Polymer 34, 2836 (1993).

The OH end group concentration is determined by potentiometric titration in dimethylformamide.

The viscosity of the polyamides is determined to DIN 53 727 on 0.5% strength by weight solutions in 96% strength by weight sulfuric acid.

Preparation and Testing of the Molding Compositions

The heat resistance of the specimens was determined via their Vicat softening point. The Vicat softening point was determined to DIN 53 460 with a force of 49.05 N and a temperature rise of 50 K per hour, using standard small specimens.

The impact strength of the products was determined on ISO specimens to ISO 179 1eU. Stiffness (modulus of elasticity) was determined to DIN 53 457, and tensile strength and elongation at break to DIN 53 455.

Flowability was determined to DIN 53 735 at 300° C. with 10 kg load.

To characterize heat resistance, tensile specimens were aged at 180° C. for a period of 1000 h. After 100, 500 and 1000 h test specimens were removed and tensile-tested. In each case, the level of ultimate tensile strength is listed in Table 1, based on the initial level (in Component A1

The polyarylene ether sulfone A1 used was Ultrason® E 2010 (commercial product of BASF AG). This product is characterized by a viscosity number of 54 ml/g, measured in 1% strength NMP solution at 25° C.

Component B1

Under an atmosphere of nitrogen, 5.167 kg of dichlorodiphenyl sulfone, 4.3905 kg of dihydroxydiphenyl sulfone and 128.85 g of 4,4'-dihydroxyvaleric acid were dissolved in 29 kg of N-methylpyrrolidone and mixed with 2.820 kg of anhydrous potassium carbonate. The reaction mixture was firstly heated for 1 h at 180° C. at a pressure of 300 mbar with continuous distilling-off of the water of reaction and N-methylpyrrolidone, and then reacted further for 6 h at 190° C. After adding 40 kg of N-methylpyrrolidone, the inorganic constituents were filtered off. Basic groups were neutralized by adding 300 ml of glacial acetic acid, and the polymer was then isolated by precipitation in water. After three extractions with water, the product was dried in vacuo at 140° C. to give a white powder. The proportion of units with acid groups was determined by $^1$H NMR as 1.4 mol %, and the viscosity number of the product was 32.7 ml/g.

Component B2

Under an atmosphere of nitrogen, 5.740 kg of dichlorodiphenyl sulfone and 5.003 kg of dihydroxydiphenyl sulfone were dissolved in 29 kg of N-methylpyrrolidone and mixed with 2.820 kg of anhydrous potassium carbonate. The reaction mixture was firstly heated for 1 h at 180° C. at a pressure of 300 mbar with continuous distilling-off of the water of reaction and N-methylpyrrolidone, and then reacted further for 6 h at 190° C. After adding 40 kg of N-methylpyrrolidone, the inorganic constituents were filtered off. Basic groups were neutralized by adding 300 ml of glacial acetic acid, and the polymer was then isolated by precipitation in water. After three extractions with water, the product was dried in vacuo at 140° C. to give a white powder.

The proportion of units with OH end groups was determined by as 0.14% by weight, and the viscosity number of the product was 56.2 ml/g.

Component C1

As polyamide C1, use was made of a partly aromatic copolyamide condensed from 55 parts by weight of terephthalic acid, 35 parts by weight of ε-caprolactam and 38.5 parts of hexamethylenediamine, and characterized by a viscosity number of 210 ml/g (measured at 0.5% strength by weight in 96% strength sulfuric acid). This product is further characterized by a glass transition point at 110° C. and by a melting peak at 289° C.

Component C2

As polyamide C2, use was made of a nylon-6 obtained from ε-caprolactam and having a viscosity number of 250 ml/g (measured at 0.5% strength by weight in 96% strength sulfuric acid), e.g. Ultramid® B4.

Component D1

Epoxy resin with a softening point of 150° C. and with an epoxy value of 0.37 eq/kg, e.g. Araldit® 6609 from Ciba.

Component E1

Chopped glass fibers with polyurethane size, fiber diameter 10 μm.

Component H

CuI was used as stabilizer.

The components were mixed in a twin-screw extruder at a melt temperature of from 300 to 350° C. The melt was passed through a water bath and pelletized.

The molding compositions comprising the polyether sulfone were processed at 340° C. The mold temperature was always 100° C.

The results of the tests are listed in Table 1 below.

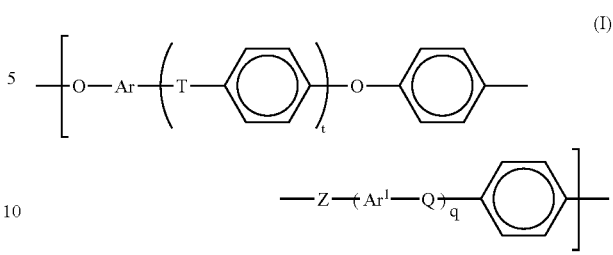

where
t and q, independently of one another, are 0, 1, 2 or 3,
each of Q, T and Z, independently of one another, is a chemical bond or a group selected from the class consisting of —O—, —S—, —SO$_2$—, S=O, C=O, —N=N—, —R$^a$C=CR$^b$— and —CR$^c$R$^d$—, and at least one of the groups T, Q and Z denotes SO$_2$, where each of R$^a$ and R$^b$, independently of one another, is hydrogen or C$_1$–C$_{12}$-alkyl and
each of R$^c$ and R$^d$, independently of one another, is hydrogen, C$_1$–C$_{12}$-alkyl, C$_1$–C$_{12}$-alkoxy or C$_6$–C$_{18}$-aryl, where R$^c$ and R$^d$ may, if desired, independently of one another have fluorine and/or chlorine substituents or, together with the carbon atom to which they are bonded, may form a C$_3$–C$_{12}$-cycloalkyl group, which may be unsubstituted or substituted by one or more C$_1$–C$_6$-alkyl groups,

TABLE 1

| Molding composition | 1c | 1 | 2 | 2c | 3c | 3 | 4 |
|---|---|---|---|---|---|---|---|
| A1 | 49 | 48 | 46 | 49 | 42 | 46 | 46 |
| B1 | — | — | — | — | 7 | 2 | — |
| B2 | — | — | 2 | — | — | — | 2 |
| C1 | 20.99 | 20.99 | 20.99 | — | — | — | — |
| C2 | — | — | — | 20.99 | 20.99 | 20.99 | 20.99 |
| D1 | — | 1 | 1 | — | — | 1 | 1 |
| E1 | 30 | 30 | 30 | 30 | 30 | 30 | 30 |
| H | 0.01 | 0.01 | 0.01 | 0.01 | 0.01 | 0.01 | 0.01 |
| Vicat B[° C.] | 206 | 205 | 205 | 202 | 203 | 203 | 203 |
| an[kJ/m$^2$] | 51 | 59 | 62 | 52 | 65 | 69 | 67 |
| Modulus of elasticity [kN/mm$^2$] | 11.7 | 11.7 | 11.6 | 11.7 | 11.8 | 11.7 | 11.8 |
| MVI[ml/10'] | 24 | 34 | 36 | 32 | 27 | 41 | 39 |
| Ultimate tensile strength [%] | | | | | | | |
| After 100 h | 96 | 94 | 95 | 97 | 95 | 96 | 96 |
| After 250 h | 87 | 86 | 89 | 91 | 91 | 92 | 92 |
| After 1000 h | 83 | 82 | 83 | 90 | 89 | 91 | 91 |

The thermoplastic molding compositions of the invention have very good heat resistance, and also improved flowability and impact strength.

We claim:
1. A thermoplastic molding composition consisting of components A, B, C, D, E and H and optionally F and G, wherein the total weight of components A to G is 100% by weight:
   a) as component A, from 30 to 60% by weight of at least one polyaryl ether sulfone having repeat units of the formula I with the proviso that at least one of the groups T, Q and Z is —SO$_2$— or C=O and if t and q are 0, Z is —SO$_2$—, and
Ar and Ar$^1$, independently of one another, are C$_6$–C$_{18}$-arylene, unsubstituted or substituted by C$_1$–C$_{12}$-alkyl, C$_6$–C$_{18}$-aryl, C$_1$–C$_{12}$-alkoxy or halogen.
   b) as component B, from 1 to 10% by weight of at least one functionalized polyaryl ether sulfone, c) as component C, from 10 to 50% by weight of at least one polyamide,
   d) as component D, from 0.5 to 2% by weight of at least one epoxy resin of the following formula II D:

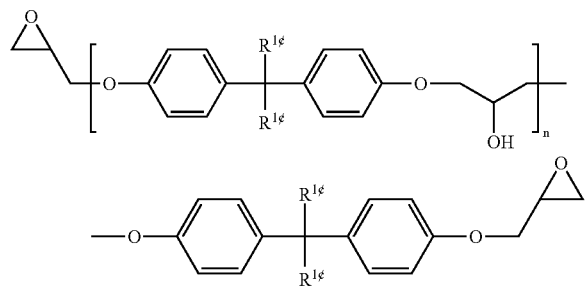

(II D)

where n from 2 to 13, and $R^{1''}$ is hydrogen or $C_1$–$C_{16}$-alkyl, having a softening point from 82 to 150° C. measured in accordance with DIN 51920, and having an epoxy value of from 1.5 to 1.9, measured in accordance with ISO 3001, e) as component E, from 1.5 to 40% by weight of fibrous or particulate fillers or a mixture of these, f) as component F, from 0 to 20% by weight of impact-modifying rubbers which have functional groups, g) as component G, from 0 to 20% by weight of other conventional additives and processing aids, h) as component H, from 100 ppm to 0.5% by weight, based on the amounts of components A to G, of copper bromide and/or copper iodide.

2. A molding composition as claimed in claim 1, wherein carbon fibers, potassium titanate whiskers, aramid fibers or glass fibers are used as component E.

3. A process for preparing molding compositions as claimed in claim 1 by mixing components A, C, D, E, H and, where appropriate, B, F and G.

4. A fiber, a film or a molding made from a composition as claimed in claim 1.

5. The molding composition defined in claim 1, wherein the epoxy value is from 1.68 to 1.75.

6. The molding composition defined in claim 1, wherein the epoxy resin of component D has a softening point from 82 to 100° C., measured in accordance with DIN 51920.

7. The molding composition defined in claim 6, wherein the softening point is from 82 to 90° C.

8. The molding composition defined in claim 1, wherein the epoxy resin of component D has a melt viscosity from 250 to 600 mPas, measured in accordance with DIN 53018 T1 at 175° C.

9. The molding composition defined in claim 8, wherein the melt viscosity is from 350 to 480 mPas.

10. The molding composition defined in claim 1, wherein the epoxy resin of component D is liquid or semi-solid.

* * * * *

UNITED STATES PATENT AND TRADEMARK OFFICE
CERTIFICATE OF CORRECTION

PATENT NO.         : 7,105,591 B2                                    Page 1 of 1
APPLICATION NO. : 10/257875
DATED              : September 12, 2006
INVENTOR(S)        : Weber et al.

It is certified that error appears in the above-identified patent and that said Letters Patent is hereby corrected as shown below:

Column 23, indicated lines 5 – 15, in formula (II D) all four instances of "$R^{1¢}$" should read --$R^{1'}$--

Column 23, indicated line "$R^{1,}$" should read --$R^{1'}$--

Signed and Sealed this

Seventeenth Day of April, 2007

JON W. DUDAS
*Director of the United States Patent and Trademark Office*